United States Patent
Feldman et al.

(10) Patent No.: US 8,362,917 B2
(45) Date of Patent: Jan. 29, 2013

(54) DEVICE FOR DETERMINING COMMUNICATIONS PARAMETERS AND METHOD OF OPERATION

(75) Inventors: Charles Feldman, Flushing, NY (US); Chi Yao Chen, Sunnyside, NY (US); Thomas Q. Wong, New York, NY (US); Michael Parobek, Ozone Park, NY (US); Vivekanand Shiwmangal, Queens Village, NY (US); Costas Magoulas, Port Jefferson Station, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 650 days.

(21) Appl. No.: 12/684,508

(22) Filed: Jan. 8, 2010

(65) Prior Publication Data

US 2011/0169658 A1 Jul. 14, 2011

(51) Int. Cl.
*G08B 23/00* (2006.01)

(52) U.S. Cl. ........... 340/870.03; 340/870.02; 455/67.11; 455/132; 455/134; 455/405; 370/431; 370/464

(58) Field of Classification Search ............ 340/870.02–870.03; 455/132, 135, 134, 67.11, 67.13, 455/405; 370/431, 464

See application file for complete search history.

(56) References Cited

U.S. PATENT DOCUMENTS

| 6,397,063 | B1 | 5/2002 | Sessions |
| 7,660,565 | B2 | 2/2010 | Patel et al. |
| 2005/0260968 | A1 | 11/2005 | Ito et al. |
| 2006/0121894 | A1 | 6/2006 | Ganesan |
| 2006/0205371 | A1 | 9/2006 | Kitani |
| 2007/0066228 | A1 | 3/2007 | Leinonen et al. |

*Primary Examiner* — Albert Wong
(74) *Attorney, Agent, or Firm* — Cantor Colburn LLP

(57) ABSTRACT

A device and method for determining communications parameters such as signal strength is provided. The device includes a plurality of meters, each having an associated transceiver configured to receive a different communications protocol. Communications signals are received by a communications module and transmitted to the plurality of meters. The plurality of meters provide an indication of a signal parameter, such as signal strength for example, to allow the operator to decide which communications protocol the end device should use.

20 Claims, 2 Drawing Sheets

DEVICE FOR DETERMINING COMMUNICATIONS PARAMETERS AND METHOD OF OPERATION

BACKGROUND OF THE INVENTION

The subject matter disclosed herein relates to a device for determining communication signal parameters and in particular to a portable device that measures parameters for evaluating different communications protocols.

Wireless communication protocols are used in a wide variety of applications to facilitate communication and data collection from remotely located devices. For example, electrical meters are often employed within facilities and residences to measure electrical power consumption by a consumer. Other consumed commodities, such as water utilities and natural gas utilities also provide metering to determine the level of consumption. These metering devices need to be periodically monitored to determine the amount of the commodity consumed so that the consumer may be billed the appropriate amount.

In the past, these meters were electromechanical devices that included mechanical dials to provide an indication of the amount of the commodity consumed. Operators physically visited these electromechanical devices to record the measured amounts. In an effort to reduce costs, automatic meter reading (AMR) and advanced metering infrastructure (AMI) type metering devices were developed that allowed the operator to determine the amount of the commodity consumed without having to physically visit each meter. These metering devices utilize different communications technologies, such a GSM or CDMA cellular services for example, which provide the metering device with communications capability with the operator. In some applications, the communications technologies provided for short-range communication, such as between the meter and an operator driving a vehicle through a neighborhood for example. Other applications use communications technologies that connect the meter with a central or distributed data center. It should be appreciated that the communication signal may vary for different locations depending on local conditions and the arrangement of the meter within the facility.

The signal variation in such cellular transmissions may hinder remote meter reading, such as when a mobile meter reader is not equipped for a particular cellular service or the meter is employing a different cellular service for example. When this occurs, the operators typically have to physically visit the meter to visually inspect and record the consumed amounts, resulting in lost time and increased costs for the operator. Therefore, it is desirable for an operator to determine which communication service is available at a particular location so that a meter having the proper service may be installed.

Accordingly, while existing methods of determining communications signal parameters are suitable for their intended purpose, improvements may be made in providing a portable device usable at an installation location for determining the availability or quality of wireless communications signals. Further improvements may also be gained in providing an arrangement for performing a communication survey for the communications connection prior to the end device installation.

BRIEF DESCRIPTION OF THE INVENTION

According to one aspect of the invention, a meter communications field survey device is provided. The field survey device includes a plurality of meters that are arranged for reception of the different communication systems. The meters are positioned at a site for a prospective power meter installation. The meter having a communications protocol that receives a communication signal that meets threshold criteria is then selected for installation at the site location.

According to another aspect of the invention, a method of determining communications protocol signal parameters prior to meter installation is provided. The method includes the steps of arranging a meter having a first transceiver arranged for receiving a first communications protocol at a site prior to installation of an end device at the site. Operating the first meter to determine whether the first communications protocol is appropriate for installation at the site. Finally, installing the end device if the first communications protocol has a parameter that meets threshold criteria.

According to yet another aspect of the invention, a method of determining electric power meter signal parameter prior to meter installation is provided. The method includes the steps of arranging a plurality of electric power meters at a prospective meter installation site. Each of the electric power meters having a different transceiver arranged for receiving corresponding different communication protocol. It is determined which of the plurality electric power meters has a parameter that meets threshold criteria. Finally, the electric power meter having a parameter that meets threshold criteria within the installation site is installed.

According to yet another aspect of the invention, a meter communications field survey device is provided. The communications field survey device includes a first meter having a first transceiver arranged for receiving a first communications protocol. A second meter having a second transceiver arranged for receiving a second communications protocol. A communications module is connected to the first and second meters to provide a signal to the first and second meters.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
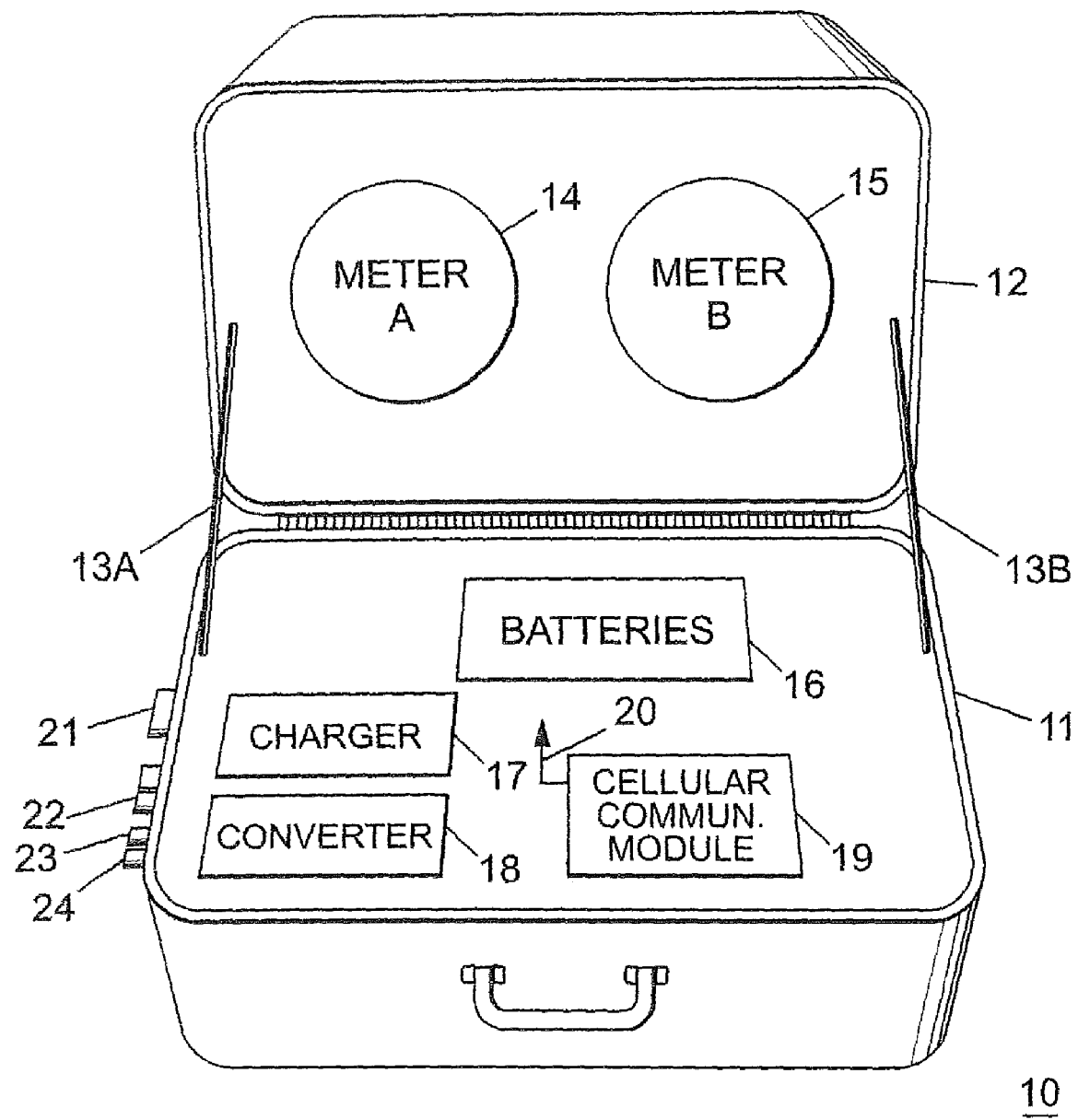
FIG. 1 is a front perspective view of the meter communications field survey device in accordance with one embodiment of the invention; and, FIG. 2 is a schematic illustration of the circuit used within the field survey device of FIG. 1.

FIG. 1 depicts an exemplary communications field survey device 10 having a housing or carrying case 11 with a cover 12. The cover 12 is joined to the case 11 by a pair of hinges 13A, 13B. The carrying case 11 may also include a handle to facilitate transportation by an operator. It should be appreciated that the survey device 10 may need to be deployed into the field in less than desirable circumstances. In the exemplary embodiment, the survey device 10 is of such a size to allow easy transportation and installation, such as the size of a briefcase or a small suitcase for example.

In the exemplary embodiment, the survey device 10 is sized to fit on the rear seat, or rear floor of a vehicle such as a standard sized sedan for example. It is also desirable that the survey device 10 is sized and of a weight to be transported by a single person so that a single operator may be dispatched to perform the meter installation. In the exemplary embodiment, the portable device 10 weighs less than 60 lbs. Further, since it is likely that the survey device 10 may need to be used in a utility room, typically located in a basement, a small size and weight will facilitate deployment in building that requires traversing narrow hallways and staircases.

A first meter 14 and a second meter 15 are positioned within the case cover 12 and are interconnected to receive power from at least one battery 16. As will be discussed in more detail below, the first meter 14 and second meter 15 each include an indicator (not shown) that provides feedback to the operator on a parameter of a received signal such as signal strength or quality for example. In the exemplary embodiment, the indicator is a visual indicator, such as a graphical icon that increases or decreases in size depending on the value of the signal parameter. In another embodiment, the indicator is a visual indicator that displays a numerical value of the signal parameter to the operator. In another embodiment, the indicator may be an audible indicator. In yet another embodiment, the meters 14, 15 may include an output connector (not shown) that may be coupled to a computing device, such as a laptop computer for example, that allows the operator to perform additional analysis on the received signal.

A communication module 39 connects with the first meter 14 and the second meter 15 for providing input signal while receiving local communications signals via antenna 20. In the exemplary embodiment, the communications module 39 may receive cellular communications signals such as the Global System for Mobile ("GSM") communications protocol, or Code Division Multiple Access ("CDMA") protocol for example. In one embodiment, the communications module 39 may have the capability to receive cellular data or cellular telephone signals. In another embodiment, the communications module 39 include a plurality of circuits or devices for receiving signals from a variety of communications protocols. These communications devices include, but are not limited to an IEEE 802.11 device commonly referred to as Wifi, a satellite device, a CDMA compliant cellular device, a GSM compliant cellular device, a radio frequency device 102, a IEEE 802.15.4 device commonly referred to as Zigbee, and a Bluetooth compliant device. In one embodiment, the satellite device transmits data on a frequency range of 3 to 40 gigahertz. In another embodiment, the radio frequency device transmits on a frequency range of 30 kilohertz to 3000 megahertz. It should be appreciated that in embodiments having a plurality of communications devices, the individual communications devices may integrated into a single communications module 19 or may be individually connectable to the meters 14, 15.

A battery charger 17 connects with the battery 16. An AC/DC converter 18 connects to the charger 17 for providing an external connection with a power source (not shown). The operator may couple the charger 17 and power converter 18 to the external power source to allow charging of the batteries 16 via input connector 21. Alternatively, electrical power for operating the survey device 10 may be obtained directly from the input connector 21. Output power from the converter 18 is obtained from the output connector 22, when needed. Operating power to the meters 14, 15 are controlled via a switch 23 and battery-charging power is provided to the battery 16 via switch 24, all located on one side of the carrying case 11.

Meters 14, 15 each include a transceiver (not shown) for receiving signals from the communications module 19. In the exemplary embodiment, each meter 14, 15 has a transceiver which is configured to communicate with a different communication networks. First meter 14 is of the type configured for communicating with a CDMA cellular network, while the second meter 15 is of the type configured for communication with a GSM cellular network. It should be appreciated that while the device 10 is described as having two meters 14, 15, this is for exemplary purposes and the claimed invention should not be so limited. The device 10 may include additional meters that are configured to communicate via other communications protocols. In one embodiment, the end device to be installed is an electrical meter, and each of the meters 14, 15 are an electrical meter that is similar to the type that will be installed.

When an electrical meter needs to be installed, the operator first transports the survey device 10 to the prospective installation site. The survey device 10 is activated via one of switches 23, 24 to provide electrical power to the meters 14, 15. The communications module 19 receives signals via antenna 20 provides a signal to the meters 14, 15. If a meter 14, 15 receives a signal that is of the appropriate protocol for the transceiver associated with the meter 14, 15, the meter 14, 15 provides an indication to the operator on a desired signal parameter, such as signal strength level for example. In another embodiment, the indicator may also provide an indication on the signal quality or other parameters that are desired by the operator. It should be appreciated that the meter will only provide an indication of the signals with the appropriate protocol. For example, a meter having a CDMA transceiver would only provide an indication of the CDMA cellular signal received by antenna 20. From the indicators on meters 14, 15, the operator may compare the desired signal parameter (e.g. signal strength) to determine which communications protocol has a desired signal parameter that meets the desired threshold criteria. It should be appreciated that the installation of an electrical meter having a communications transceiver that receives a signal having a parameter that meets or exceeds a desired threshold should result in more reliable operation and therefore be less costly to operate and maintain. Once the communications protocol having the desired parameter is determined, the electrical meter may be installed at the desired location.

It should be appreciated that the communications protocol having the highest signal level may not always be installed. For example, if both meters 14, 15 indicate a higher than desired signal level, the operator may decide to install the electrical meter having a transceiver with a particular communications protocol based on other factors. These factors include, but are not limited to operating costs; equipment reliability, equipment cost, and communications costs for example.

Figure 2:
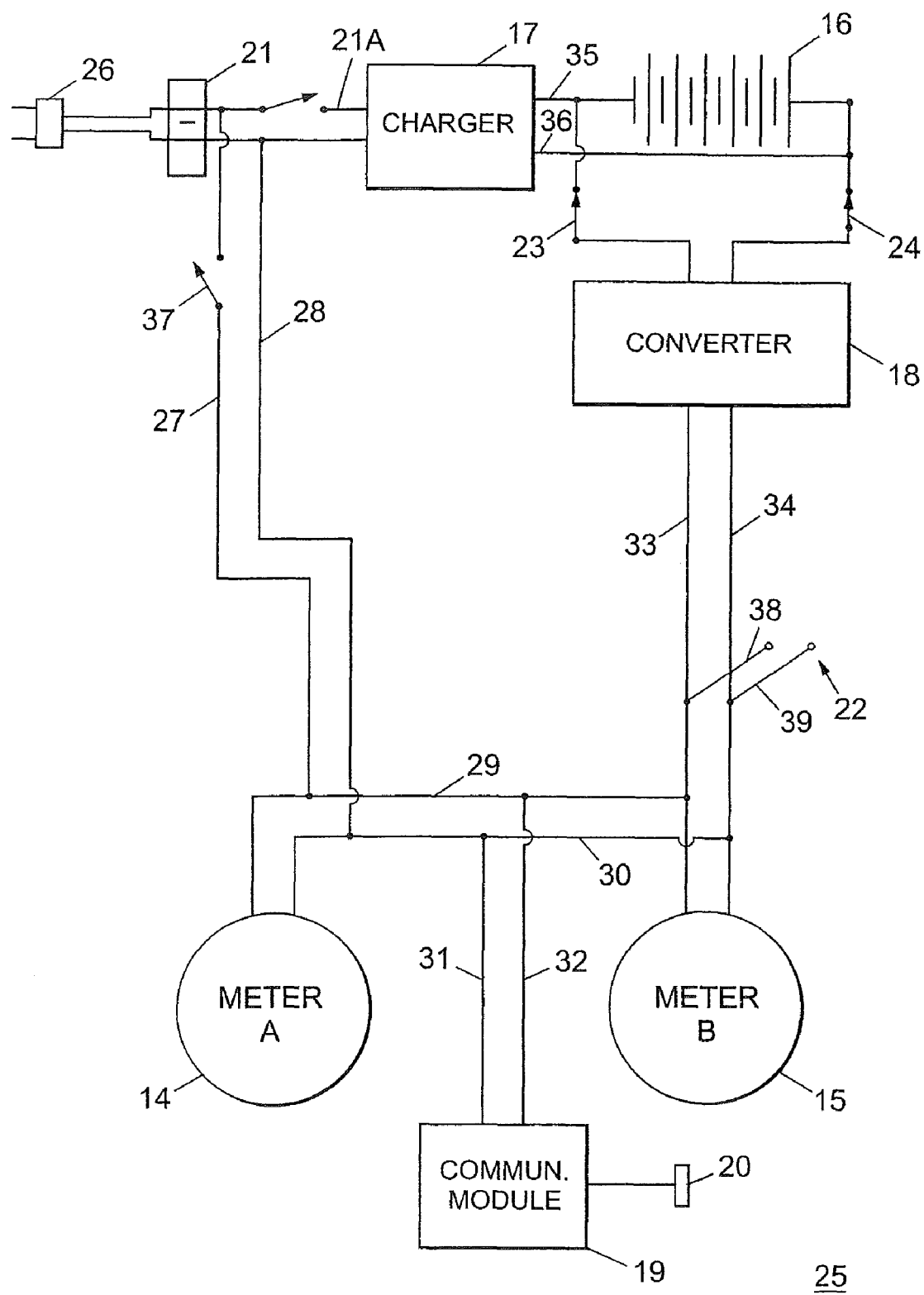

One embodiment of the circuit 25 within the field survey device 10 of FIG. 1 is illustrated in FIG. 2. The circuit 25 includes an electric plug 26 that provides input power to the charger 17 via input connector 21. A switch 21A provides a connection for charging battery 16 via conductors 35, 36. Alternating current ("AC") operating power to meters 14, 15 is provided over first conductors 27, 28 to second conductors 29, 30 and switch 37. Third conductors 31, 32 connect communications module 19 and antenna 20 to the AC operating power.

When AC operating power is unavailable, AC operating power is provided to the meters 14, 15 from the battery 16, through switches 23, 24 and converter 18 via fourth conductors 33, 34. The fourth conductors 33, 34 connect with second conductors 29, 30. An AC power output connector 22 is available via fifth conductors 38, 39 for providing operating power to associated external equipment (not shown), when such equipment is desired and external AC power is unavailable.

It should be appreciated that while the embodiments herein describe the use of the survey device 10 in association with the installation of an electrical meter, this is for exemplary purposes and the claimed invention should not be so limited. The survey device 10 may be suitable for other applications where multiple communications protocol options are available and a signal parameter may effect the operation of the application. Other applications may include but is not limited to, water metering, natural gas metering, propane metering, industrial gas (e.g. hydrogen, oxygen, nitrogen, helium, air, fluorine, chlorine or argon) metering, waste or sewage metering, remote device monitoring, and utility network monitoring devices for example. The communications companies may also use the survey device 10 to assist in determining the availability of competitive services, or to determine where additional communications services may be desired.

The survey device 10 described herein provides a number of advantages. The survey device 10 is small, portable and lightweight such that a single operator, even in confined spaces, may transport the device to the desired installation location. The survey device 10 provides the operator with the ability to evaluate signal parameters for different communications protocols simultaneously to assist in determining what type of communications transceiver should be utilized in the installed end device. The survey device 10 may provide for more reliable operation of an end device that may result in lower operating costs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining communication a signal parameter prior to installation of an end device, the method comprising:
arranging a first meter having a first transceiver arranged for receiving a first communications protocol at a site prior to installation of said end device at said site;
arranging a second meter having a second transceiver arranged for receiving a second communications protocol at a site prior to installation of said end device at said site wherein the first and second meters are within a self-contained housing;
operating said first meter to determine a first signal quality parameter;
operating said second meter to determine a second signal quality parameter; and,
installing at the site said end device with a third transceiver arranged for receiving said first communications protocol when said first signal quality parameter meets a desired threshold.

2. The method of claim 1 wherein said end device is an electrical power meter.

3. The method of claim 2 wherein said first signal quality parameter is signal strength and said second signal quality parameter is signal strength.

4. The method of claim 3 wherein said first communications protocol is a CDMA protocol.

5. The method of claim 3 wherein said first communications protocol is a GSM protocol.

6. The method of claim 3 further comprising installing said end device with a fourth transceiver arranged for receiving said second communications protocol when said second signal quality parameter meets a desired threshold.

7. A method of installing an electrical power meter comprising the steps of:
arranging a plurality of electric power meters in a self-contained housing, each of said electric power meters having a different type of transceiver for receiving a different type of communication signal;
arranging said self-contained housing at an installation site;
receiving a plurality of communications signals at each of said plurality of electric power meters; and,
determining a signal quality parameter for each of said plurality of electric power meters;
determining if a first electric power meter of said plurality of electric power meters received a communications signal meeting a first quality threshold, said first electric power meter having a first type transceiver arranged to receive a first communication signal; and,
installing a second electric power meter at the site having a second transceiver arranged to receive said first type of communications signal.

8. The method claim 7 further comprising determining a third electrical power meter of said plurality of electric power meters received a communications signal meeting a second quality threshold, said third electric power meter having a third transceiver arranged to receive a second communication signal.

9. The method of claim 8 wherein said second transceiver is arranged to receive said second communications signal.

10. The method of claim 9 wherein said first quality threshold and said second quality threshold is a communications signal strength threshold.

11. The method of claim 9 wherein said first quality threshold and said second quality threshold is a communications signal quality threshold.

12. A communications field survey device comprising:
a self-contained housing;
a first meter arranged in said housing, said first meter having a first signal quality indicator and a first transceiver arranged for receiving a first signal, said first signal compliant with a first communications protocol;
a second meter arranged in said housing, said second meter having a second signal quality indicator and a second transceiver arranged for receiving a second signal, said second signal compliant with a second communications protocol; and,
a communications module electrically coupled to said first meter and said second meter to provide operating signals to said first and second meters.

13. The communications field survey device of claim 12 further comprising:
at least one battery arranged in said housing; and
a power converter arranged in said housing and electrically coupled between said battery and said first meter.

14. The communications field survey device of claim 13 further comprising:
   a power input to said housing; and,
   a charging circuit arranged in said housing and electrically coupled between said power input and said battery.

15. The communications field survey device of claim 12 wherein said housing further includes a handle.

16. The communications field survey device of claim 15 wherein said housing is sized to fit in a vehicle.

17. The communications field survey device of claim 16 wherein said device is sized and of an appropriate weight to be carried by a single person.

18. The communications field survey device of claim 13 wherein said second signal quality indicator is a visual indicator operably coupled to said first transceiver.

19. The communications field survey device of claim 18 wherein said second signal quality indicator is a visual indicator operably coupled to said second transceiver.

20. The communications field survey device of claim 19 wherein said first signal quality indicator displays a signal strength of said first signal and said second signal quality indicator display a signal strength of said second signal.

* * * * *